United States Patent [19]
Linkner, Jr.

[11] Patent Number: 6,124,775
[45] Date of Patent: Sep. 26, 2000

[54] BOBBINLESS SOLENOID COIL

[75] Inventor: Herbert L. Linkner, Jr., Dexter, Mich.

[73] Assignee: Kelsey-Hayes Company, Livonia, Mich.

[21] Appl. No.: 09/301,048

[22] Filed: Apr. 28, 1999

Related U.S. Application Data

[63] Continuation-in-part of application No. 08/811,667, Mar. 5, 1997, abandoned.
[60] Provisional application No. 60/083,342, Apr. 28, 1998.

[51] Int. Cl.⁷ .................................................. H01F 7/00
[52] U.S. Cl. ....................................... 335/278; 251/129.15
[58] Field of Search ........................... 335/220, 278–284; 251/129.01, 129.15–129.21; 336/90

[56] References Cited

U.S. PATENT DOCUMENTS

| | | | |
|---|---|---|---|
| 2,151,213 | 3/1939 | Kelley | 335/126 |
| 2,449,438 | 9/1948 | Wisegarver . | |
| 3,474,371 | 10/1969 | Miller . | |
| 3,609,610 | 9/1971 | Flentge | 335/202 |
| 4,186,363 | 1/1980 | Schmidt, Jr. et al. . | |
| 4,228,415 | 10/1980 | Schantz . | |
| 4,439,751 | 3/1984 | Gibas | 335/278 |
| 4,439,914 | 4/1984 | Sassano | 29/605 |
| 4,498,067 | 2/1985 | Kumokawa et al. . | |
| 4,639,703 | 1/1987 | Metcalfe . | |
| 4,728,916 | 3/1988 | Fontecchio et al. . | |
| 4,943,794 | 7/1990 | Suzuki et al. . | |
| 5,111,172 | 5/1992 | Laskaris . | |
| 5,297,327 | 3/1994 | Waldsmith . | |
| 5,353,002 | 10/1994 | Jozefczyk . | |
| 5,384,197 | 1/1995 | Koyama et al. . | |
| 5,895,026 | 4/1999 | Linkner, Jr. et al. | 251/129.15 |

Primary Examiner—Lincoln Donovan
Attorney, Agent, or Firm—MacMillan, Sobanski & Todd, LLC

[57] ABSTRACT

A bobbinless coil for a solenoid valve having at least one free standing wire termination. The turns of the coil winding are bound together by an adhesive coating. An end cap having at least one terminal post is adjacent to one end of the coil winding with the post receiving and supporting the free standing wire termination. The terminal post and wire termination extend through an arpeture formed though a ferromagnetic flux casing which encloses the winding and end cap. A flux ring is disposed in an open end of the flux casing and secured thereto to retain the winding and end cap therein.

17 Claims, 17 Drawing Sheets

BOBBINLESS SOLENOID COIL

CROSS REFERENCE TO RELATED APPLICATIONS

This application is a continuation-in-part of U.S. patent application Ser. No. 08/811,667 filed on Mar. 5, 1997, now abandoned, and also claims the benefit of U.S. Provisional Application Ser. No. 60/083,342, filed Apr. 28, 1998.

BACKGROUND OF THE INVENTION

This invention relates in general to solenoid valves for anti-lock brake systems and in particular to a bobbinless solenoid coil.

An Anti-lock Brake System (ABS) is often included as standard equipment on new vehicles. When actuated, the ABS is operative to control the operation of some or all of the vehicle wheel brakes. A typical ABS includes a plurality of solenoid valves mounted within a control valve body and connected to the vehicle hydraulic brake system. Usually, a separate hydraulic source, such as a motor driven pump, is included in the ABS for reapplying hydraulic pressure to the controlled wheel brakes during an ABS braking cycle. The pump is typically included within the control valve body while the pump motor is mounted upon the exterior of the control valve body.

An ABS further includes an electronic control module which has a microprocessor. The control module is electrically coupled to the pump motor, a plurality of solenoid coils associated with the solenoid valves and wheel speed sensors for monitoring the speed and deceleration of the controlled wheels. The control module is typically mounted upon the control valve body to form a compact unit which is often referred to as an ABS electro-hydraulic control unit.

During vehicle operation, the microprocessor in the ABS control module continuously receives speed signals from the wheel speed sensors. The microprocessor monitors the speed signals for potential wheel lock-up conditions. When the vehicle brakes are applied and the microprocessor senses an impending wheel lock-up condition, the microprocessor is operative to actuate the pump motor and selectively operate the solenoid valves in the control unit to cyclically relieve and reapply hydraulic pressure to the controlled wheel brakes. The hydraulic pressure applied to the controlled wheel brakes is adjusted by the operation of the solenoid valves to limit wheel slippage to a safe level while continuing to produce adequate brake torque to decelerate the vehicle as desired by the driver.

Referring now to FIG. 1, there is shown a sectional view of a typical ABS solenoid valve 10 mounted upon an ABS control valve body 11. The valve 10 includes an axially shiftable armature 12 which is biased in an upward direction by a spring 13 such that a ball valve, generally represented by a reference numeral 14, is maintained in a normally open position. The ball valve 14 cooperates with a valve seat member 15 which is mounted in the valve body 11. The armature 12 is slideably disposed within a valve sleeve 16 having a closed end. A solenoid coil 20 is carried by the valve sleeve 16 and surrounds the armature 12. The coil 20 is enclosed by a metal flux casing 21. An annular flux ring 22 is disposed in the open end of the flux casing 21. The flux casing 21 and flux ring 22 complete a magnetic flux path which passes through the armature 12 and the valve seat member 15.

The solenoid coil 20 is of conventional design, comprising a winding 23 formed from multiple turns of an insulated magnet wire having a round cross section, such as #28½ magnet wire. The coil wire is helically wound upon a plastic bobbin 24. A pair of terminal pin supports 25 extend in an axial direction from the top of the bobbin 24. Each of the supports 25 is molded over a terminal pin 26. An end 27 of the coil winding wire is wound around the base of each of the terminal pins 26 and soldered thereto. The pins 26 are electrically coupled to the ABS microprocessor.

When it is necessary to actuate the valve 10 during an anti-lock braking cycle, an electric current is supplied through the terminal pins 26 to the coil 20. The current establishes a magnetic field in the armature 12 which pulls the armature 12 in a downward direction, closing the ball valve 14. When the current is interrupted, the magnetic field collapses, allowing the spring 13 to return the armature 12 to its original position, thereby reopening the ball valve 14. An ABS control unit also typically includes other solenoid valves, such as normally closed solenoid valves (not shown), which have structures similar to the normally open valve 10 described above.

SUMMARY

This invention relates to bobbinless solenoid coils for ABS solenoid valves and a method for making such coils.

A solenoid valve is actuated by a magnetic field generated by a solenoid coil when an electric current flows through the coil. For serviceability, the solenoid coils are typically located external to the ABS control valve body in a control module which can be removed from the control valve body without opening the hydraulic brake circuit of the vehicle. Accordingly, valve sleeves containing the valve armatures extend from the valve body and into the armature coils. Thus, the total volume required by the ABS electro-hydraulic control unit is a function of the size of the solenoid coils. It would be desirable to reduce the solenoid coil size to allow a corresponding reduction in the ABS electro-hydraulic control unit size.

The present invention contemplates reducing the size of solenoid valve coils by eliminating the coil bobbin. For a solenoid coil formed from helically wound wire, the strength of the magnetic field is directly proportional to the number of turns of wire in the coil and the magnitude of the current drawn by the coil. Elimination of the bobbin allows a reduction in the solenoid coil diameter and a corresponding reduction in the diameter of the coil winding wire without reducing the magnetic field strength. Also, the solenoid coil volume is a function of the square of the diameter of the wire forming the coil while the magnitude of the current drawn by the solenoid coil is a function of the diameter of the coil wire raised to the fourth power. Accordingly, reduction of the wire diameter should allow a significant reduction in the size of the coil and the amount of power required to energize the coil. Alternately, a bobbinless coil having the same size as a conventional coil wound upon a bobbin would produce a stronger field for the same amount of electric current.

The present invention contemplates a coil for a solenoid valve comprising a winding having a plurality of turns of helically wound magnet wire and an adhesive coating binding the turns into a rigid structure. The winding includes an axial bore adapted to receive a valve sleeve of a solenoid valve. In the preferred embodiment, the adhesive coating is an epoxy. The winding is formed with at least one flexible terminal wire extending therefrom. A circular disc is adjacent to an end of the winding and has at least one terminal post extending in a generally perpendicular direction therefrom which supports the terminal wire.

The terminal post can have an axial slot formed therein, the slot extending radially to an edge of the disc and receiving the terminal wire. Alternately, the terminal post can have an axial bore formed therethrough which receives the terminal wire.

The invention further contemplates that a first layer of an electrically insulative material can be disposed upon the inner surface of the winding axial bore and a second layer of electrically insulative material can be disposed upon the outer periphery of the winding.

The winding and disc are disposed within a cylindrical flux casing having a closed end and an open end, the closed end including at least one aperture formed therethrough. The terminal post and terminal wire extend through the flux casing arpeture. A resilient washer is disposed in the open end of the flux casing adjacent to the end of the winding. Alternately, a washer formed from an electrically insulative material can be disposed in the open end of the flux casing adjacent to the end of the winding. An annular flux ring also is disposed in the open end of the flux casing adjacent to the resilient washer, the flux ring being secured to the flux casing to retain the winding and disc within the flux casing.

The present invention also contemplates a method for forming a coil for an ABS solenoid valve which includes the steps of providing a coil winding machine having a coil mandrel. An annular flux ring and an end cap are placed upon the mandrel with the end cap being spaced apart from the insulative washer in an axial direction. A wire is wound upon the mandrel between the insulative washer and the end cap to form a winding. The end cap is pressed against the end of the winding and flux casing is placed over the components upon the mandrel to form a coil assembly. In the preferred embodiment, the winding wire is coated with a thermally cured adhesive, such as an epoxy. An electric current which heats the wire to initially set the adhesive is passed through the winding while the winding is upon the mandrel. The coil assembly can then be removed from the mandrel and the adhesive further cured in an oven. Alternately, heat may be applied to the wire as the winding is wound or a solvent used to soften the adhesive coating.

Other objects and advantages of the invention will become apparent from the following detailed description of the invention and the accompanying drawings.

DETAILED DESCRIPTION OF THE PREFERRED EMBODIMENT

Figure 1:
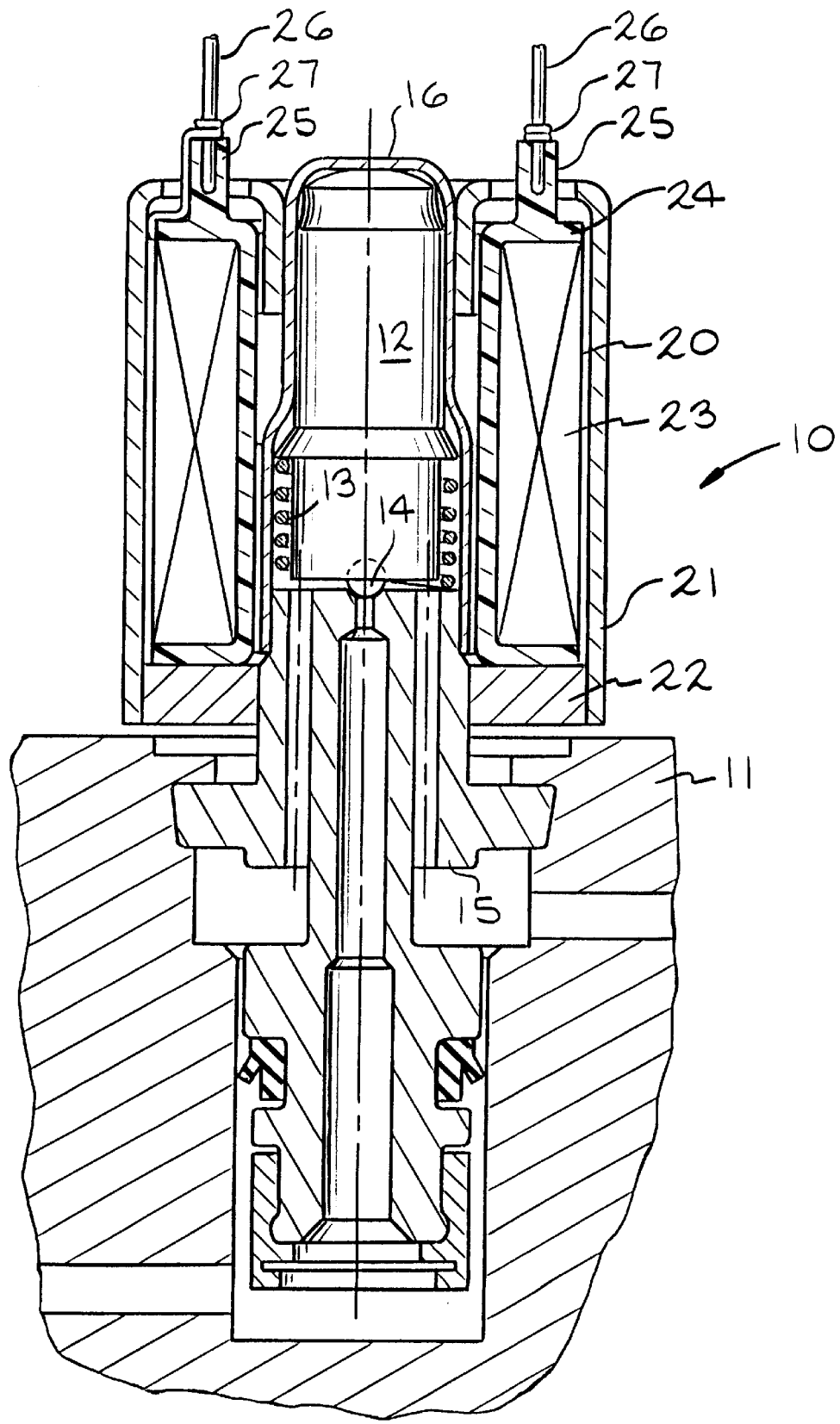
FIG. 1 is a sectional view of a prior art ABS solenoid valve.
Figure 2:
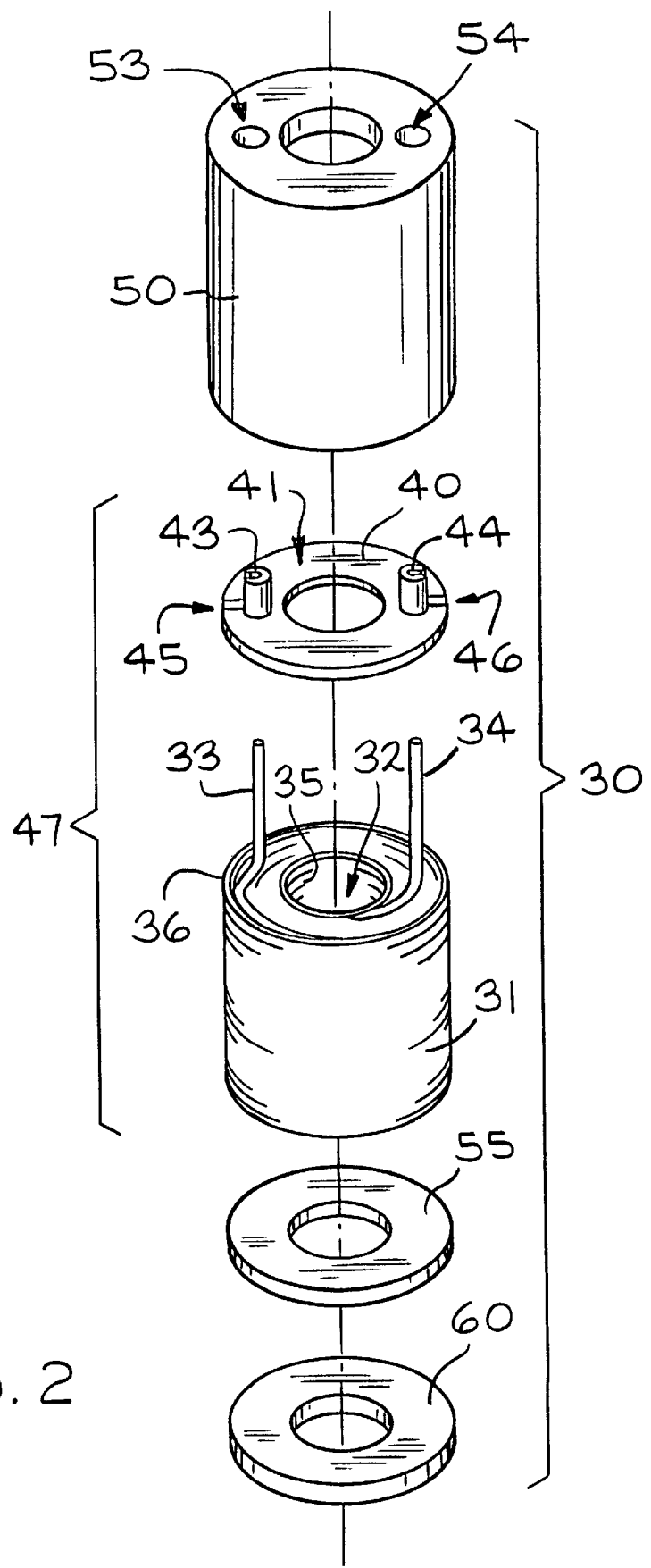
FIG. 2 is an exploded perspective view of a bobbinless solenoid coil for an ABS solenoid valve in accordance with the invention.
Figure 3:
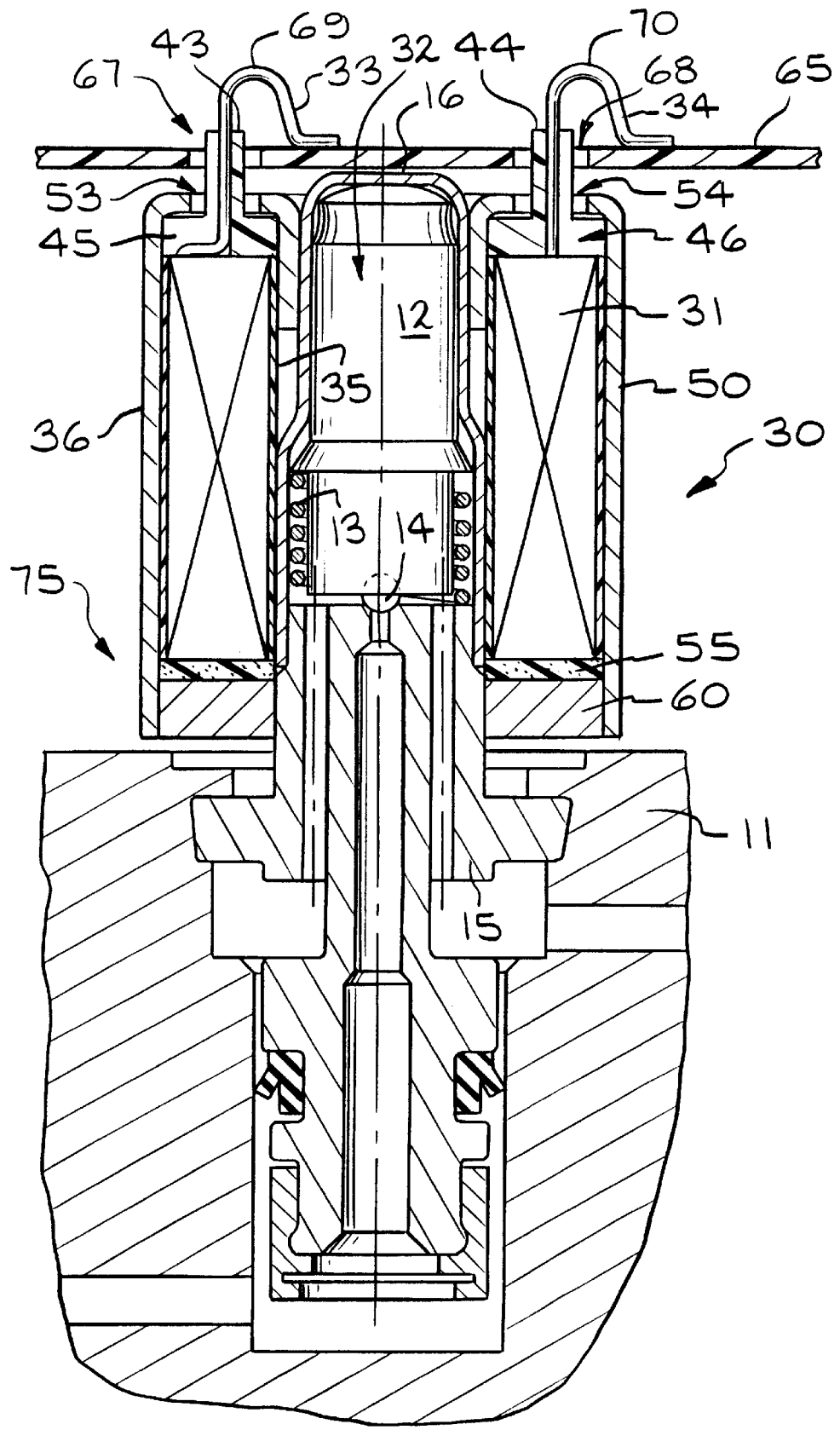
FIG. 3 is a sectional view of an ABS solenoid valve which includes the bobbinless solenoid coil shown in FIG. 2.

Referring again to the drawings, there is illustrated in FIGS. 2 and 3 an improved solenoid coil 30 which has no bobbin. Components shown in FIG. 3 which are similar to components shown in FIG. 1 have the same numerical designators.

The bobbinless solenoid coil 30 includes a winding 31 having an axial bore 32 and a pair of free standing terminal wires 33 and 34. The winding 31 is helically wound from a continuous length of insulated solenoid magnet wire. As will be described below, the coil wires are rigidly bonded together with an adhesive. Accordingly, a plastic bobbin is not required to maintain the structure of the winding.

In the preferred embodiment, a first layer 35 of a commercially available poyimide tape, such as, for example, Kapton tape, is disposed upon the inner surface of the bore 32 and a second layer 36 of the same poyimide tape is wrapped around the periphery of the winding 31 to enhance the structural integrity thereof. While a polyimide tape is used in the preferred embodiment, it will be appreciated that other commercially available electrically insulating tapes also can be used. Alternately, a thin plastic shield or sleeve (not shown) can be used instead of tape. It will appreciated that the first and second layers of tape 35 and 36 are optional, and the invention can be practiced without the tape layers.

A disc-shaped end cap 40 is located adjacent to the upper end of the winding 31. In the preferred embodiment, the end cap 40 is formed from plastic and has an aperture 41 formed through the center thereof. As shown in FIG. 3, the aperture 41 receives the end of the valve sleeve 16. The end cap 40 further includes a pair of terminal posts 43 and 44 which extend in a generally perpendicular direction from the top surface of the end cap 40. As shown in FIGS. 2 and 3, the terminal posts 43 and 44 include axial slots 45 and 46, respectively, which extend radially from the center of the associated terminal post to the outer edge of the end cap 40. Each of the slots 45 and 46 receives one of the free standing terminal wires 33 and 34, respectively. The end cap 40 and winding form a winding assembly 47.

Figure 7A:
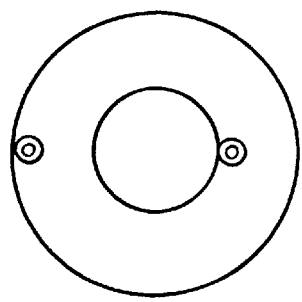
FIGS. 7A–H illustrate alternate structures for an end cap included in the bobbinless solenoid coil shown in FIG. 2.
Figure 7D:
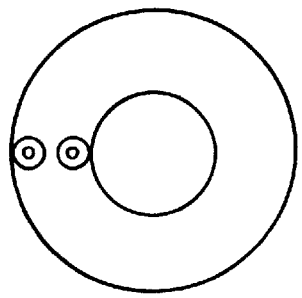

While slotted terminal posts 43 and 44 are illustrated in FIGS. 2 and 3, it will be appreciated that the terminal posts also can be formed having axial bores extending therethrough, such as shown in FIG. 7A. For such an end cap, the terminal wires 33 and 34 would extend through the axial bores. The invention further contemplates that the winding assembly 47 can be encapsulated (not shown); however, this step is optional. The encapsulate would bond the end cap to the coil winding while protecting the winding.

A conventional cup-shaped steel flux casing 50 receives the winding assembly 47. A pair of terminal post apertures 53 and 54 are formed through the top end of the flux casing 50. Each of the terminal post apertures 53 and 54 receives one of the terminal posts 43 and 44, respectively. Thus, the terminal posts 43 and 44 guide the free standing terminal wires 33 and 34 through the flux casing apertures 53 and 54. Additionally, the terminal posts 43 and 44 support the terminal wires 33 and 34 while providing additional insulation and strain relief therefor.

The coil 30 also includes an elastic foam washer 55 disposed within the flux casing 50 adjacent to the lower end of the winding 31. The foam washer 55 provides a preload force upon the winding 31 to prevent relative movement between the winding 31 and other coil parts which potentially could cause winding wear and shorting. Alternately, an elastic O-ring (not shown) can be positioned adjacent to the lower end of the winding 31 or a layer of a elastometer (not shown), such as silicone rubber, can be applied to the lower end of the winding 31. Upon curing, the elastometer forms an elastic layer.

A steel flux ring 60 is disposed in the flux casing 50 below the foam washer 55 to provide a return path for the magnetic flux generated by the winding 31. The flux ring 60 also retains the other coil components within the flux casing 50. In the preferred embodiment, the flux ring 60 is retained in the lower end of the flux casing 50 by an interference fit; however, the flux ring 60 also can be secured within the casing 50 by spot welding, dimples or swaging.

As shown in FIG. 3, the coil 30 is mounted upon a Printed Circuit Board (PCB) 65 which has electrical traces (not shown) deposited upon its upper surface. The PCB 65, which is included in an ABS electronic control module (not shown), carries electronic logic and switching components for energizing the coil 30. The PCB 65 has a pair of terminal post openings 67 and 68 formed therethrough which correspond to the coil terminal posts 43 and 44. The coil terminal posts 43 and 44 and associated terminal wires 33 and 34 extend through the PCB terminal post openings 67 and 68, respectively. The terminal wires 33 and 34 are formed into semi-circular loops 69 and 70 with their free ends soldered to the electrical traces on the surface of the PCB 65. The terminal wire loops 69 and 70 allow lateral movement of the coil 30 relative to the PCB 65 to accommodate manufacturing tolerances of the assembled control valve (not shown).

As best seen in FIG. 3, the coil 30 is associated with a solenoid valve 75. The bore of the coil 30 receives the sleeve 16 which contains a solenoid valve armature 12. The armature 12 is urged in an upward direction in FIG. 3 by a spring 13. A valve ball 14 is mounted upon the bottom surface of the armature 12. The valve ball cooperates with a valve seat 15 which is mounted in an ABS control valve body 11.

Figure 4:
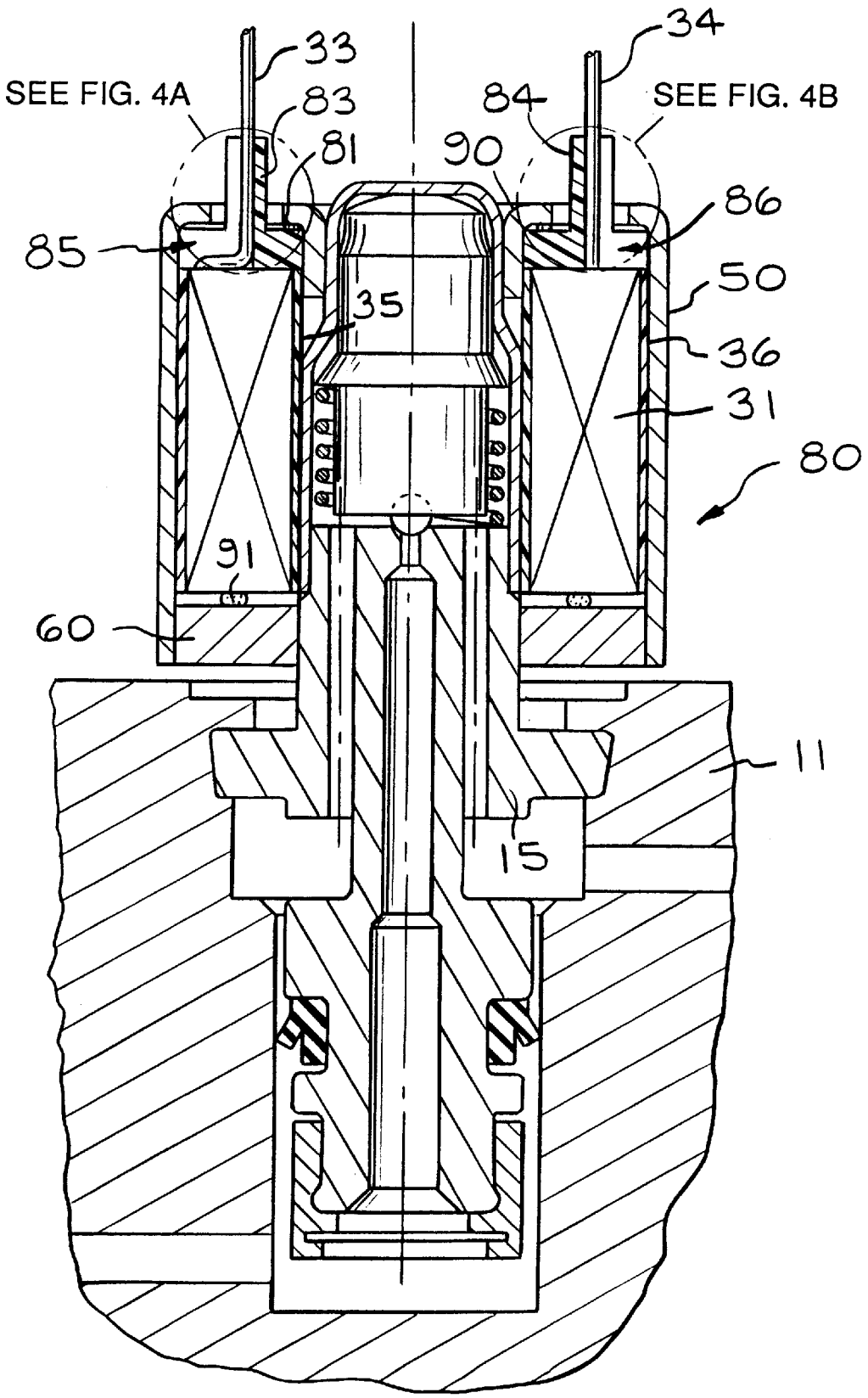
FIG. 4 is a sectional view of an alternate embodiment of the bobbinless solenoid coil shown in FIG. 2.

An alternate embodiment 80 of the bobbinless coil is illustrated in FIG. 4. Components in FIG. 4, which are the same as components in FIG. 3 have the same numerical designators. The outside diameter of the solenoid coil 80 is increased while the height of the coil 80 is decreased from the corresponding dimensions of the coil 31 shown in FIG. 3. This allows both the coil 80 in FIG. 4 and the prior art coil 20 to produce the same magnetomotive forces with the same size wires. Additionally, if the same number of turns are used on both coils 20 and 80, the coils 20 and 80 will draw the same current, but the coil 80 in FIG. 4 will have a height which is less than the height of the prior art coil 20. If the length of the coil 80 is increased from the minimum height just described, the magnetomotive force of the lengthened coil will remain constant, but the current drawn by the coil will decrease in proportion to the ratio of length increase to the initial length.

Figure 4A:
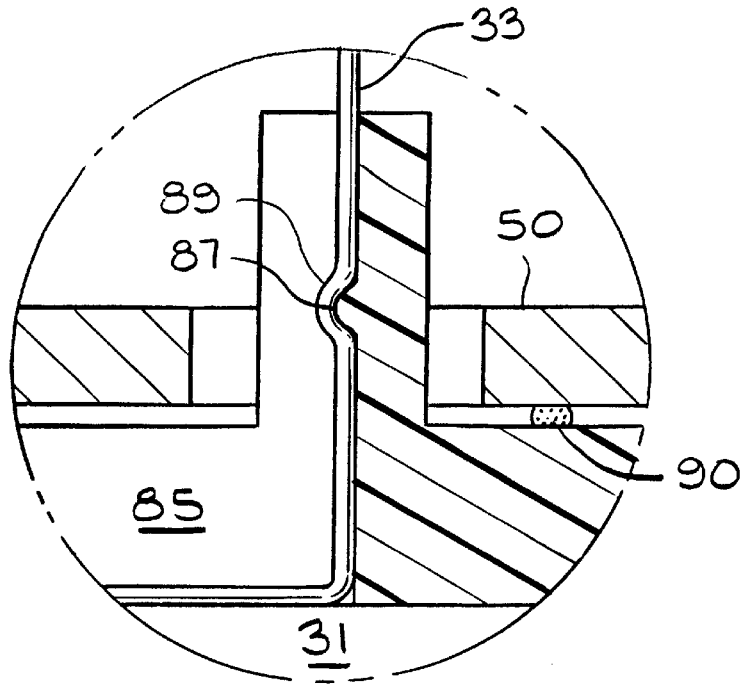
FIG. 4A is an enlarged fragmentary sectional view of the upper left portion of the coil assembly shown in FIG. 4.
Figure 4B:
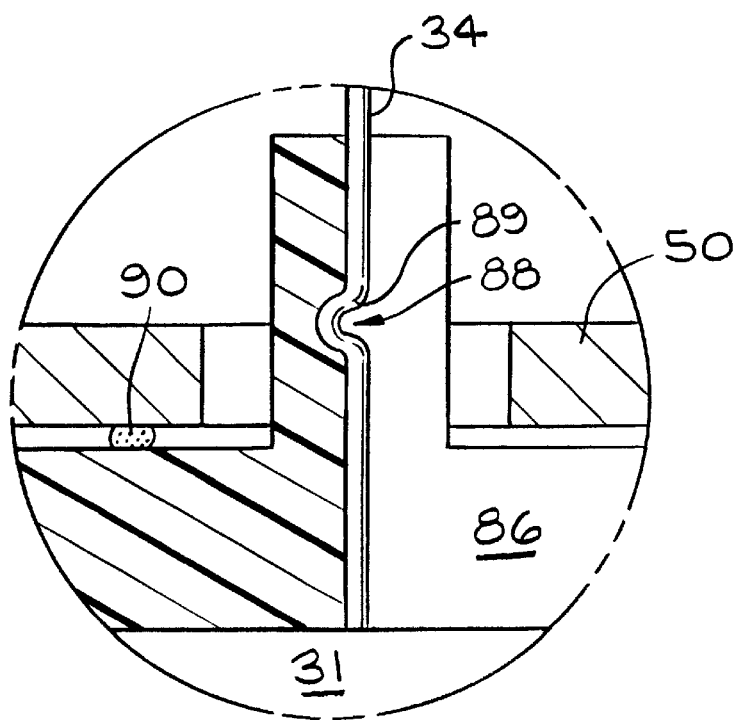
FIG. 4B is an enlarged fragmentary sectional view of the upper right portion of the coil assembly shown in FIG. 4.

The coil 80 includes an end cap 81 which includes a pair of terminal posts 83 and 84 having axial slots 85 and 86, respectively, formed therein. As best seen in FIGS. 4A and 4B, a bead 87 is formed in one slot 85 and an indention 88 formed in the other slot 86. Upon inserting the terminal wires 33 and 34 into the slots 85 and 86, the wires 33 and 34 are pressed against the bead 87 and into the indention 88 to form a small kink 89 in each wire. The kinks 89 cooperate with the bead 87 and the indentation 88, respectively, to secure the wires 33 and 34 within the slots 85 and 86.

Additionally, a first bead 90 of an adhesive is disposed between the end cap 81 and the inside surface of the top of the flux casing 50 to secure the end cap 81 within the casing 50. A second bead 91 of adhesive is disposed between the lower end of the winding 31 and the flux ring 60 to prevent relative movement between the winding 31 and the other coil components. Accordingly, the foam washer 55 described above can be omitted from the coil 80. The adhesive forming the beads 90 and 91 can be a contact adhesive or an adhesive that is thermally activated when the coil wire is bonded together.

Figure 5:
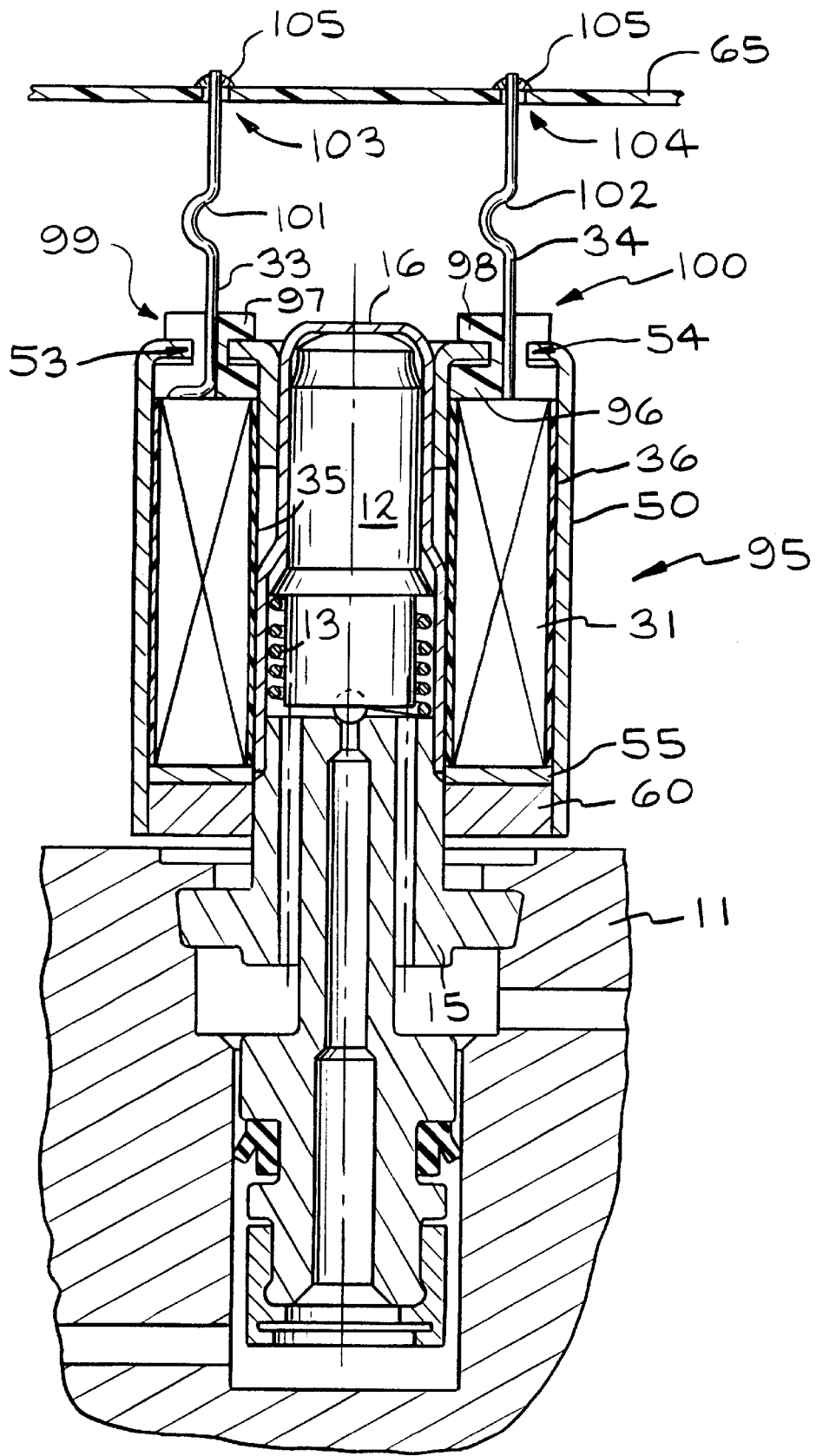
FIG. 5 is a sectional view of another alternate embodiment of the bobbinless solenoid coil shown in FIG. 2.

Another alternate embodiment 95 of the bobbinless coil is illustrated in FIG. 5. Components in FIG. 5, which are the same as components in FIGS. 3 and 4 have the same numerical designators. As shown in FIG. 5, the bobbinless coil 95 includes an end cap 96 which has terminal posts 97 and 98 overmolded in the flux casing apertures 53 and 54. The overmolded terminal posts 97 and 98 retain the end cap 96 in the flux casing 50. Similar to the end cap structures described above, a pair of slots 99 and 100 are formed in the posts 97 and 98, respectively. Each of the terminal post slots 99 and 100 receives one of the free standing terminal wires 33 and 34.

While the terminal posts 97 and 98 are shown as being overmolded on the flux casing 50 in FIG. 5 and a bead of adhesive 90 is used to retain the end cap 81 in the flux casing 50 in FIG. 4, it will be appreciated that other structures or methods can be used to attach the end cap to the flux casing. For example, the terminal posts can be press fit into the flux casing apertures (not shown). Alternately, spring clips (not shown), which engage the flux casing, can be formed upon the terminal posts.

A portion of each of the free standing terminal wires 33 and 34 is formed into semi-circular loops 101 and 102, respectively. The loops 101 and 102 provide strain relief and accommodate alignment tolerances between the PCB 65 and the solenoid valve sleeve 16. The end of each of the terminal wires 33 and 34 extends 12 through an associated aperture 103 and 104, respectively, which is formed through the PCB 65. The ends of the terminal wires 34 and 34 are retained in the apertures 103 and 104 and electrically connected to conductive traces (not shown) on the upper surface of the PCB 65 by solder 105. It will further be appreciated that the connections between the bobbinless coils and the PCB 65 described and illustrated above are exemplary and that the invention can be practiced with other structures than those shown for electrically connecting the bobbinless coils to the other components of the ABS.

Figure 6:
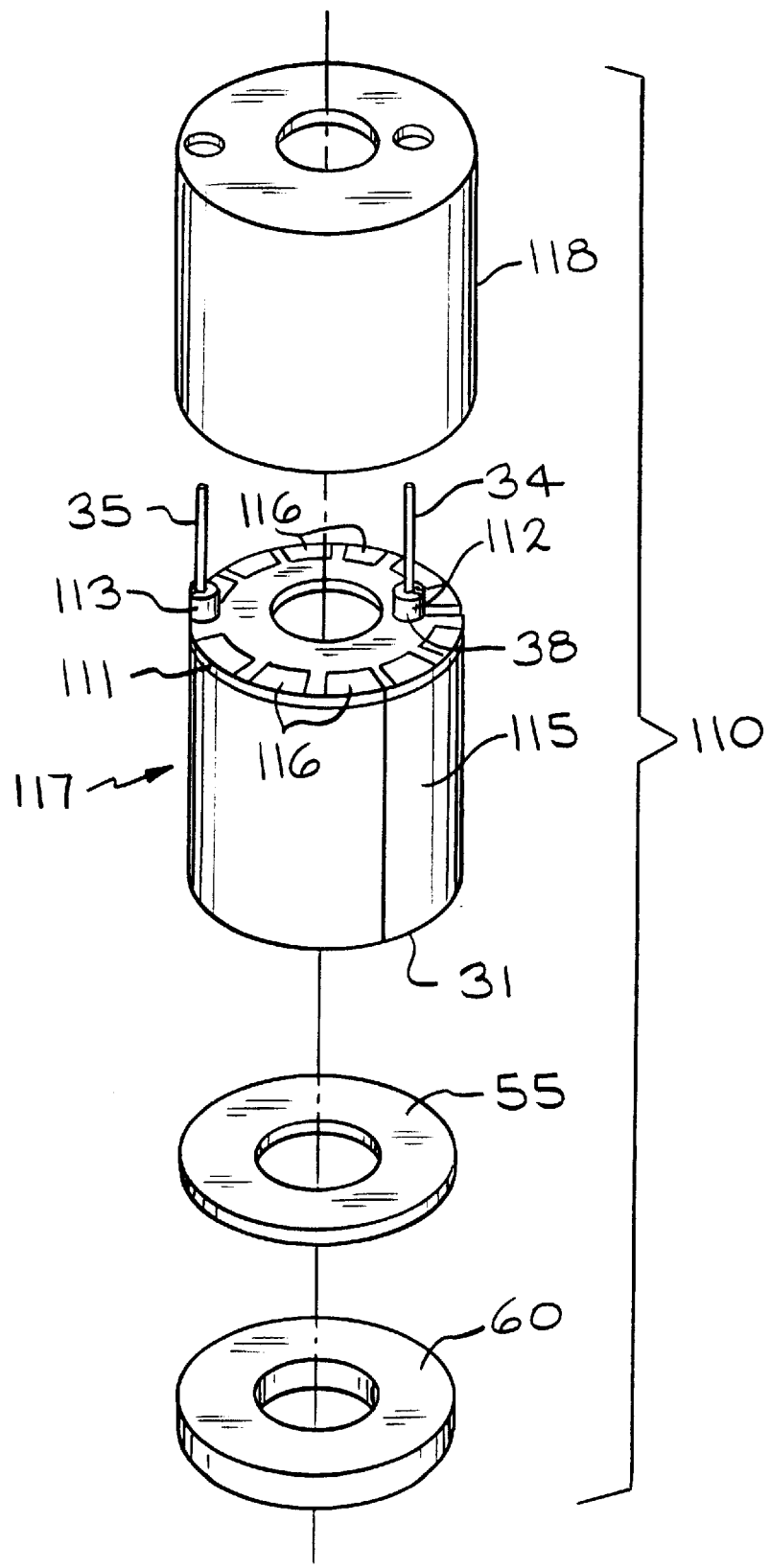
FIG. 6 is an exploded perspective view of another alternate embodiment of the bobbinless solenoid coil shown in FIG. 2.

Another embodiment of the structure for the bobbinless coil is shown at 110 in FIG. 6. Again, components of the coil 110 which are the same as components of the bobbinless coils described above have the same numerical designators. The coil 110 includes a coil winding 31 and an end cap 111 having slotted terminal posts 112 and 113 which extend from the inner and outer circumference, respectively, of the end cap 111. As shown in FIG. 6, the exterior of the coil winding 31 and the outer edge of the end cap 111 is wrapped with a layer of adhesive backed Kaptan tape 115 The upper edge of the Kaptan tape 115 is formed with a plurality of upper tabs 116. The upper tabs 116 are folded onto the upper surface of the end cap 111. Similarly, the lower edge of the Kaptan tape is formed with a plurality of lower tabs (not shown) which are folded onto the bottom surface of the winding 31. The upper tabs 116 retain the end cap 35 on the winding 31 to form a winding assembly 117 while the lower tabs protect the outer surface of the winding 31.

Similar to the coil 30 described above, the winding assembly 117 is disposed within a flux casing 118 with the terminal posts 113 and 112 and the associated terminal wires 33 and 34 extending axially through corresponding terminal post apertures in the flux casing 118. An elastic foam washer 55 is disposed in the open end of the flux casing 118 adjacent to the lower end of the winding assembly and a flux ring 60 is secured in the lower end of the casing 118. In an alternate embodiment of the coil structure shown in FIG. 6, the lower tabs of the Kapton tape 115 are folded over the foam washer 55 and retain the washer 55 on the coil winding 31 (not shown).

It will be appreciated that the terminal posts shown in FIGS. 2 through 6 are illustrative of the invention and that the invention can be practiced with alternate structures for the end cap. Several alternate structures for the end cap are illustrated in FIG. 7. FIG. 7H corresponds to the end cap structure shown in FIGS. 2 through 4. The other examples of end caps shown in FIG. 7 are intended to be illustrative and it will be appreciated that the invention can be practiced with other structures and positioning of the terminal posts than are shown in FIG. 7. It will be noted that both slots and bores formed in the terminal posts are illustrated. Additionally, the invention contemplates that the slots could be formed having lateral tapers (not shown) for securing the terminal wires within the slots.

Figure 7G:
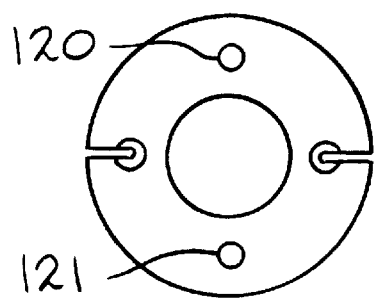
Figure 7B:
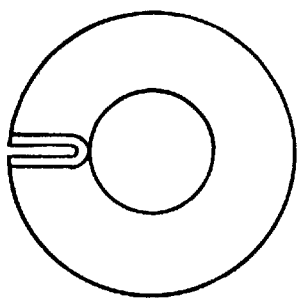
Figure 7E:
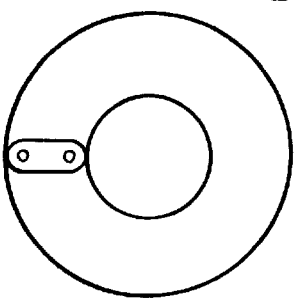
Figure 7H:
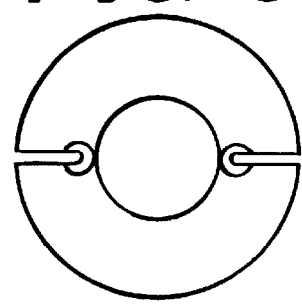
Figure 7C:
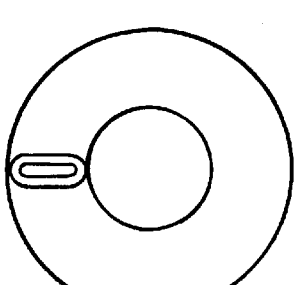
Figure 7F:
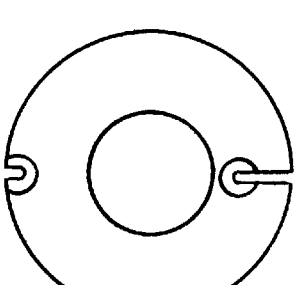

The end cap illustrated in FIG. 7G includes a pair of studs 120 and 121 which extend in a generally perpendicular direction from the top surface of the end cap. The invention contemplates that the studs extend through corresponding apertures formed though the top of a flux casing (not shown). The ends of the studs 120 and 121 are formed by a conventional method into rivet heads (not shown) to secure the end cap within the flux casing. It will be appreciated that if a winding is attached to the end cap as described above, the rivets will also secure the winding 31 within the flux casing.

While the invention has been illustrated by coils having a pair of terminal wires, it also will be appreciated that the invention may be practiced to form a coil with only one terminal wire and one terminal post extending through the flux return casing. The other end of the coil winding would be in electrical contact with the associated solenoid valve sleeve to provide an electrical return path through the control valve body.

The reduced diameter bobbinless coil 30, shown in FIGS. 2 and 3, provides a number of advantages over prior art coils. In the preferred embodiment, the diameter of the coil is reduced from 20.13 mm to 15.53 mm, which is a 23% reduction. Additionally the current drawn by the bobbinless coil is reduced from the current drawn by the prior art coils. In the preferred embodiment, the current draw is reduced by 22% while the control valve width can be reduced by up to 18.4 mm by reducing the spacing between the solenoid valves, subject to size reduction of other ABS components.

The reduced height bobbinless coil 80, shown in FIG. 4, provides the similar advantages. In the preferred embodiment, based only upon the coil, the valve height can potentially be reduced by up to 10.4 mm; however, this height reduction may be limited by the size of other ABS components to 3 to 4 mm. This height reduction permits a corresponding reduction in the overall height of the ABS control valve.

It will be appreciated that while the invention has been illustrated by a reduced diameter coil 30 and a reduced height coil 80, the invention also contemplates other sizes of bobbinless coils which have not been specifically shown or described above. Thus, it would be possible to design a coil with both a reduced height and diameter which has dimensions falling between the extremes illustrated above. Such a coil would allow corresponding reductions in the height and width of the ABS control valve and may permit placement of the control valve in more advantageous locations on the vehicle.

Additionally, while the preferred embodiment of the invention has been described and illustrated for a bobbinless coil and an associated end cap having terminal posts, it also will be appreciated that the invention can be practiced for a bobbinless coil without the end cap (not shown). Such a coil would have the free standing terminal wires ends extending through the flux casing apertures. An optional adhesive bead could be disposed between the top end of the coil and the flux casing which would prevent relative motion therebetween. The adhesive bead also could extend into the flux casing apertures to prevent contact between the free standing terminal wires and the flux casing.

Figure 8:
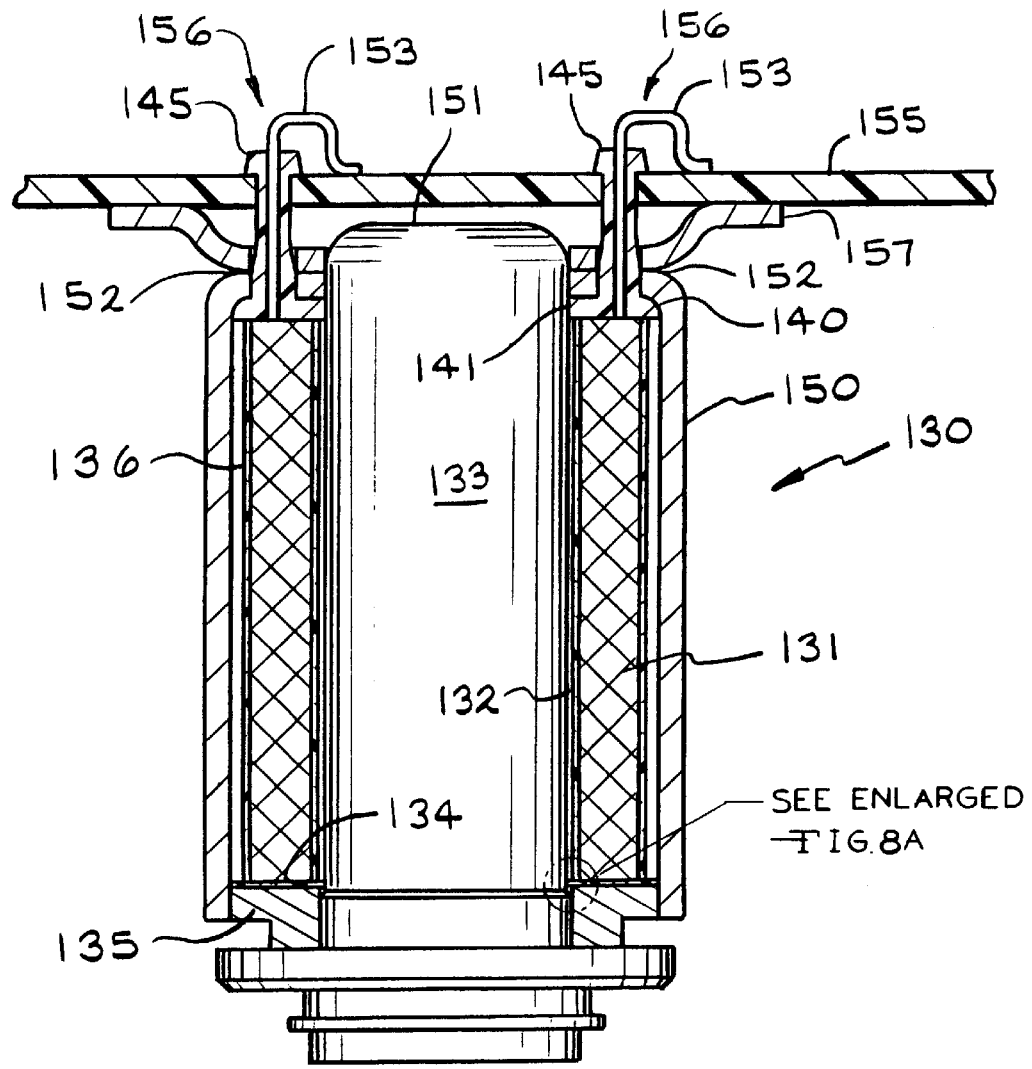
FIG. 8 is a sectional view of another embodiment to a bobbinless solenoid coil assembly in accordance with the invention.
Figure 8A:
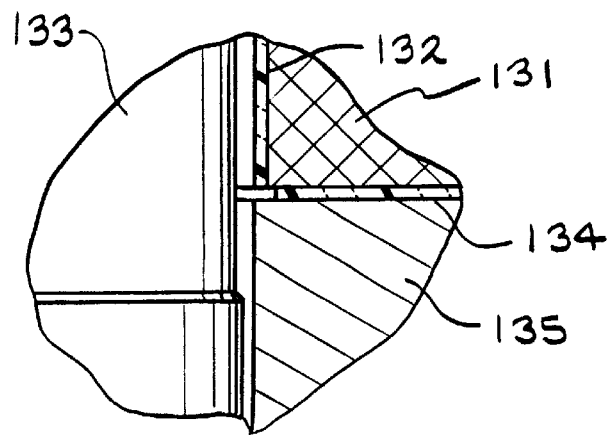
FIG. 8A is an enlarged fragmentary sectional view of a portion of the bobbinless solenoid coil assembly shown in FIG. 1.

Referring again to the drawings, there is illustrated in FIG. 8, a sectional view of another embodiment of a bobbinless solenoid coil assembly 130 in accordance with the invention. The coil assembly 130 includes a multiple-turn bobbinless coil 131. As will be explained below, the turns are wound upon a thin electrically insulative tube 132 which, in the preferred embodiment is formed from Kapton (polyimide). A solenoid valve sleeve 133 extends axially through the tube 132. As best seen in FIG. 8A, an optional washer 134 formed from an electrically insulative material, such as Kapton, is disposed between the lower end of the coil 131 and an annular flux ring 135. The washer 134 can be formed from a single sided or double sided adhesive tape. Alternately, a quick curing adhesive can be disposed between the coil 131 and the flux ring 135 (not shown). An optional cylindrical layer 136 of an electrically insulative material, such as Kapton tape, can be formed over the radial outer surface of the coil 131.

An end cap 140 formed from an insulative material, such as a plastic, is adjacent to the upper end of the coil 131.

Figure 9:
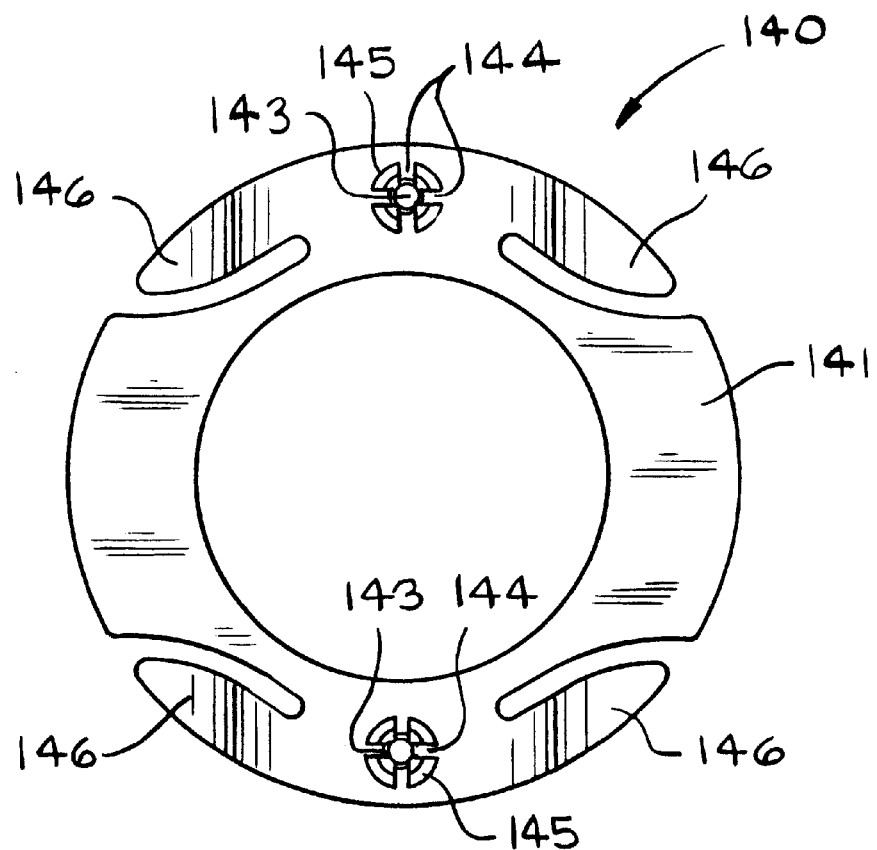
FIG. 9 is plan view of an end cap which is included in the coil assembly shown in FIG. 8.
Figure 10:
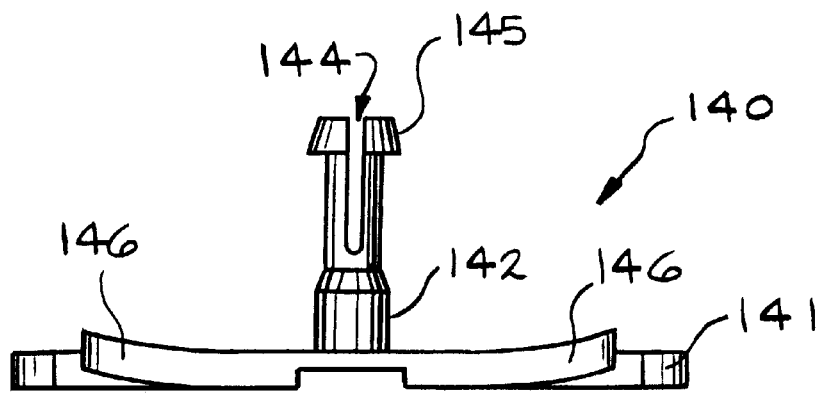
FIG. 10 is a side view of the end cap shown in FIG. 9.

Details of the end cap 140 are shown in FIGS. 9 and 10. The end cap 140 includes an annular base 141. A pair of terminal support towers 142 extend in an axial direction from the upper surface of the base 141. An axial bore 143 extends through each of the towers 142 and a pair of perpendicular transverse slits 144 extend across the upper portion of each tower 142. The upper end of each tower 142 is formed as a barb 145 which has a larger diameter than the rest of the support tower 142. The slits 144 extend through the barbs 145 and provide a spring loading therefor. A plurality of resilient fingers 146 are integrally formed upon the circumference of the base 141. As best seen in FIG. 10, the fingers 146 are curved in an upward direction to urge the coil 131 in axial downward direction against the flux ring 135. While the fingers 146 are illustrated as curing in an upward direction in FIG. 10, it will be appreciated that the invention also can be practiced with the fingers curving in a downward direction (not shown). The axial loading supplied by the fingers 146 assures a good thermal contact between the coil 131 and the flux ring 135 to form a good thermal path for conduction of heat generated by operation of the coil 131 through the associated solenoid valve and into the large mass of an adjacent hydraulic control valve (not shown).

The fingers 146 also center the coil 131 within a cup shaped flux casing 150 which encloses the coil 131 and flux ring 135. While four fingers 146 are shown in FIG. 9, it will be appreciated that the invention also can be practiced with more or less fingers (not shown). The flux casing 150 has a large central aperture 151 formed though its upper surface which receives the valve sleeve 133. Additionally, a pair of smaller apertures 152 are formed through the upper surface of the flux casing 150. As shown in FIG. 8, the terminal support towers 142 extend through the smaller apertures 152 while a coil lead 153 extends through the axial bore 143 formed in each tower 142.

The coil assembly 130 is mounted upon a Printed Circuit Board (PCB) 155. The PCB 155 has a pair of apertures 156 formed therethrough which receive the terminal support towers 142. The transverse slits 144 allow compression of the barbs 145 as they are inserted through the PCB apertures 156. Once the barbs 145 pass through the corresponding aperture 156, they spring back to their original shape to lock the coil assembly 130 in position upon the PCB 155. The present invention contemplates that the diameter of the support towers 142 is less than the diameter of the PCB apertures 156. The smaller diameter of the towers 142 allows lateral and/or axial movement of the coil assembly 130 relative to the PCB 155 to accommodate positional tolerances between the solenoid valves, which are mounted in a control valve body (not shown) and the PCB 155. In the preferred embodiment, the coil assembly 130 can move up to one mm in either a lateral or axial direction relative to the PCB 155. Additionally, the ends of coil leads 153 are formed into flexible loops 156 to allow for movement of the coil assembly 130 relative to the PCB 155. It is desirable that the coil assembly 130 fits very accurately upon a corresponding solenoid valve stem to assure formation of an efficient magnetic circuit.

The invention further contemplates providing a resilient loading device 157, such as a coil spring, a leaf spring, a Belleville washer, or a washer formed from a resilient material, such as neoprene or foam, between the coil assembly 10 and the lower surface of the PCB 40 to urge the coil assembly 10 and flux casing 30 against the control valve body. For example, a coil spring could be disposed about each of the terminal support towers 22. Alternately, a coil spring could be disposed about the upper end of the valve sleeve 13 or a leaf spring could be disposed between the flux casing 30 and the PCB 40.

Figure 11:
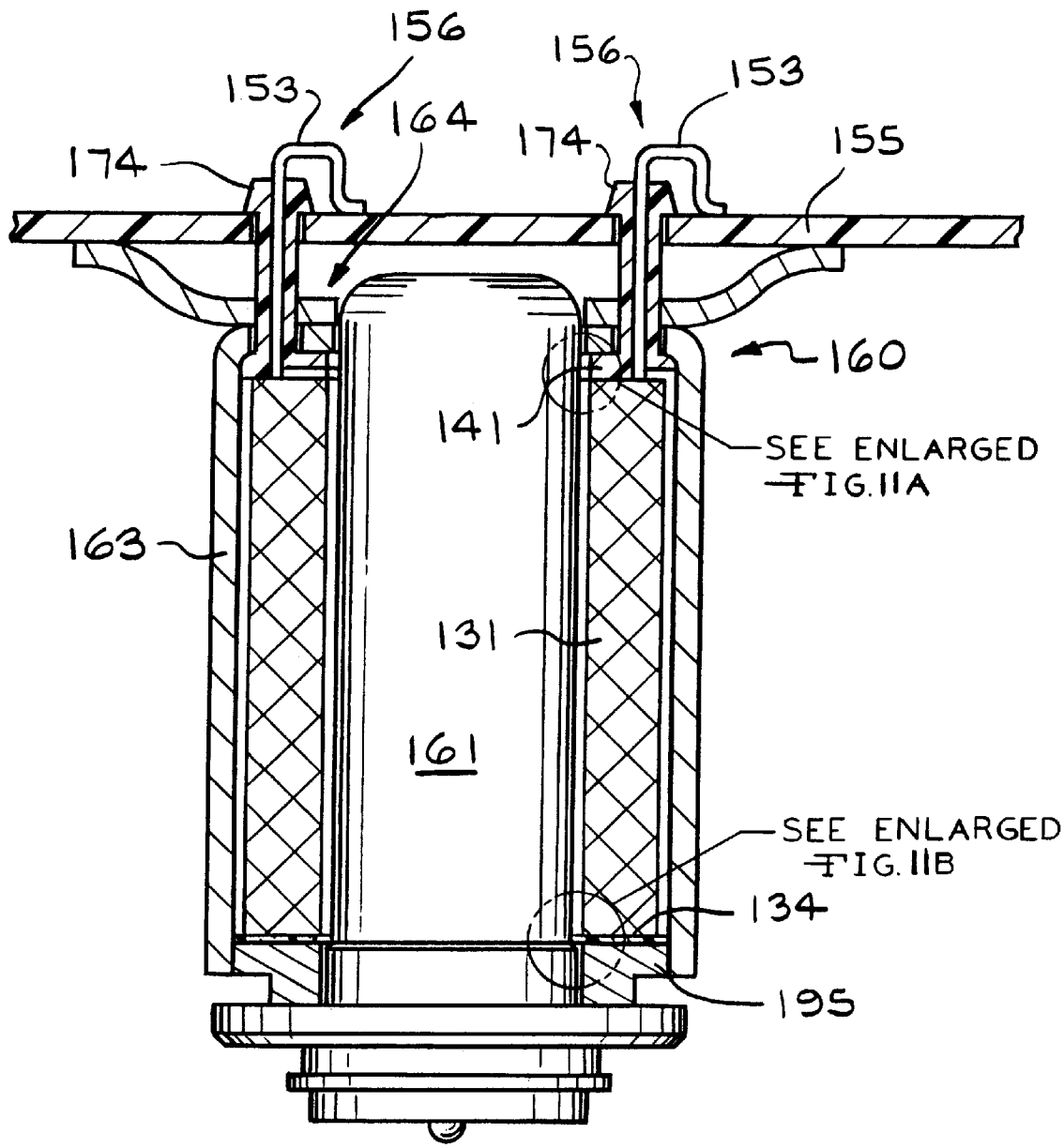
FIG. 11 is an alternate embodiment of the coil assembly shown in FIG. 8.

An alternate embodiment of the coil assembly is shown generally at 160 in FIG. 11. Components shown in FIG. 11 which are similar to components shown in FIG. 8 are identified by the same numerical designators. The coil assembly 160 includes a bobbinless coil winding 131 which is mounted upon a stepped solenoid valve sleeve 161. The lower portion of the valve sleeve 161 has an increased diameter, which forms a step 162. The coil assembly 160 is enclosed within a flux casing 163 having a reduced diameter central aperture 164 from the flux casing 150 shown in FIG. 8.

Figure 11A:
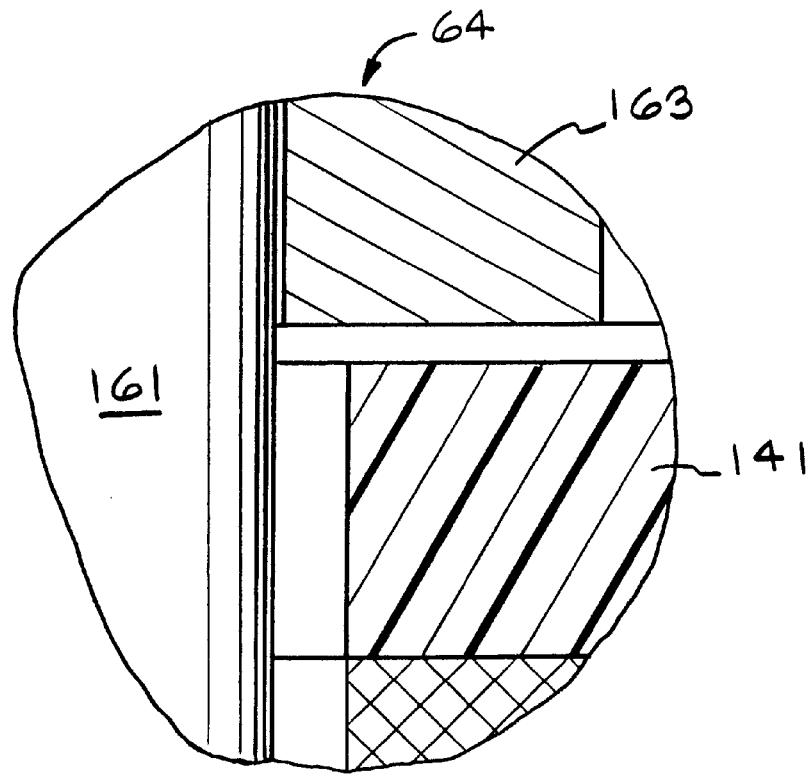
FIG. 11A is an enlarged fragmentary sectional view of an upper portion of the coil assembly shown in FIG. 11.
Figure 11B:
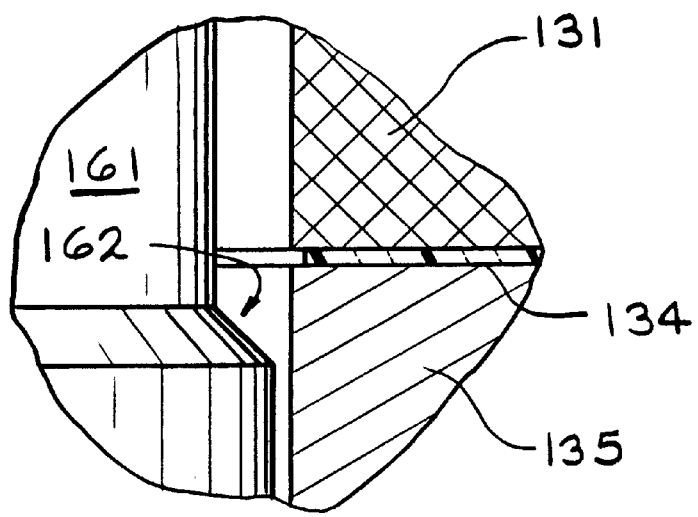
FIG. 11B is an enlarged fragmentary sectional view of a lower portion of the coil assembly shown in FIG. 11.

As best seen in FIGS. 11A and 11B, the invention also contemplates that the bobbinless coil 131 cooperates with the stepped valve sleeve 161 and the likewise decremented central aperture 614 in the flux casing 163 to prevent the coil 131 from contacting either the valve sleeve 161 or the flux casing 163. Accordingly, the inside and outside diameter electrically insulating layers 132 and 136 described above for the coil assembly 130 shown in FIG. 8 are not needed for the coil assembly 160 and can be omitted. Alternately, the central arpeture formed through the end cap 141 can have a reduced diameter to provide alignment of the coil 131 relative to the valve sleeve 161. Additionally, the apertures in the end cap 140 and flux ring 135 can be formed having a smaller diameter than the inside diameter of the winding to provide the above described separation between a non-stepped valve sleeve and the winding.

In the preferred embodiment, 27 to 29 AWG magnet wire gage is used to wind the coil. Such coil wire is sufficiently stiff and similar to size to the separate terminal posts used in prior art coils. Accordingly, the separate terminal posts of prior art coil assemblies and their associated installation and soldering equipment can be eliminated.

Figure 12:
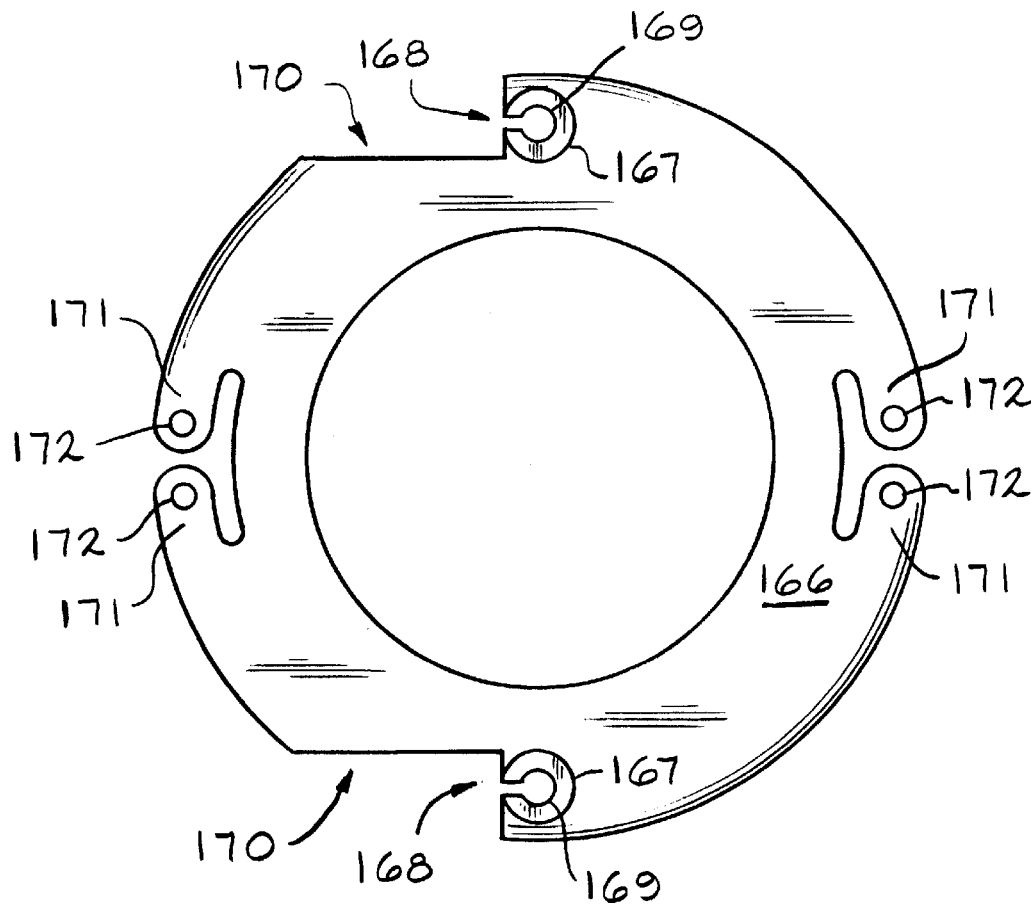
FIG. 12 is plan view of an alternate embodiment of an end cap which is included in the coil assembly shown in FIG. 11.
Figure 13:
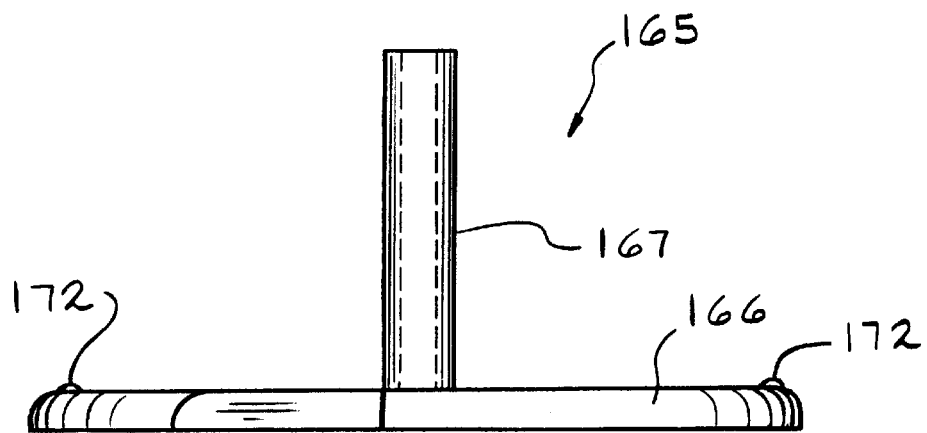
FIG. 13 is a side view of the end cap shown in FIG. 12.

The coil assembly 160 further includes an alternate embodiment of an end cap 165, which is illustrated in FIGS. 12 and 13. The end cap 165 is molded from a plastic material and includes an annular base 166. A pair of lead chimneys 167 extend axially from the base 166. An axial snap-in groove 168 and an axial guide channel 169 are formed in each of the chimneys 167. A pair of recesses 170 are formed in the circumference of the base 166 adjacent to the lower end of the chimneys 167. As will be explained below, the recesses 170 function to guide the lead wires into the chimney guide channels 169. As best seen in FIG. 12, a plurality of resilient spring fingers 171 are also formed on the circumference of the base 166. A dimple 172 is formed upon the upper surface of the end of each of the fingers 171. Similar to the fingers 146 described above, the fingers 171 function as springs to urge the coil assembly 160 in a downward axial direction in FIG. 11 when the dimples 172 contact the inside surface of the flux casing 163. Alternately, the fingers can be curved as described above. In the preferred embodiment, the upper ends of the chimneys 167 are heated and flattened to form retaining heads 174 after being inserted through associated apertures 156 formed through the PCB 155.

The retaining heads 174 retain the coil assembly 160 upon the PCB 155. It is contemplated that the chimneys 167 have a smaller diameter than the associated apertures formed in the PCB 155. Accordingly, the coil assembly 160 can move axially and laterally relative to the PCB 155 to accommodate part tolerances. In the preferred embodiment, the retaining heads 174 are formed and the coil leads 153 are soldered to electrical traces on the surface of the PCB 155 in the same operation. As described above, it is also contemplated that the coil assembly 160 can move axially and laterally relative to the PCB 155. Alternately, the ends of the chimneys 167 can be formed as slotted barbs (not shown), as described above.

Figure 14:
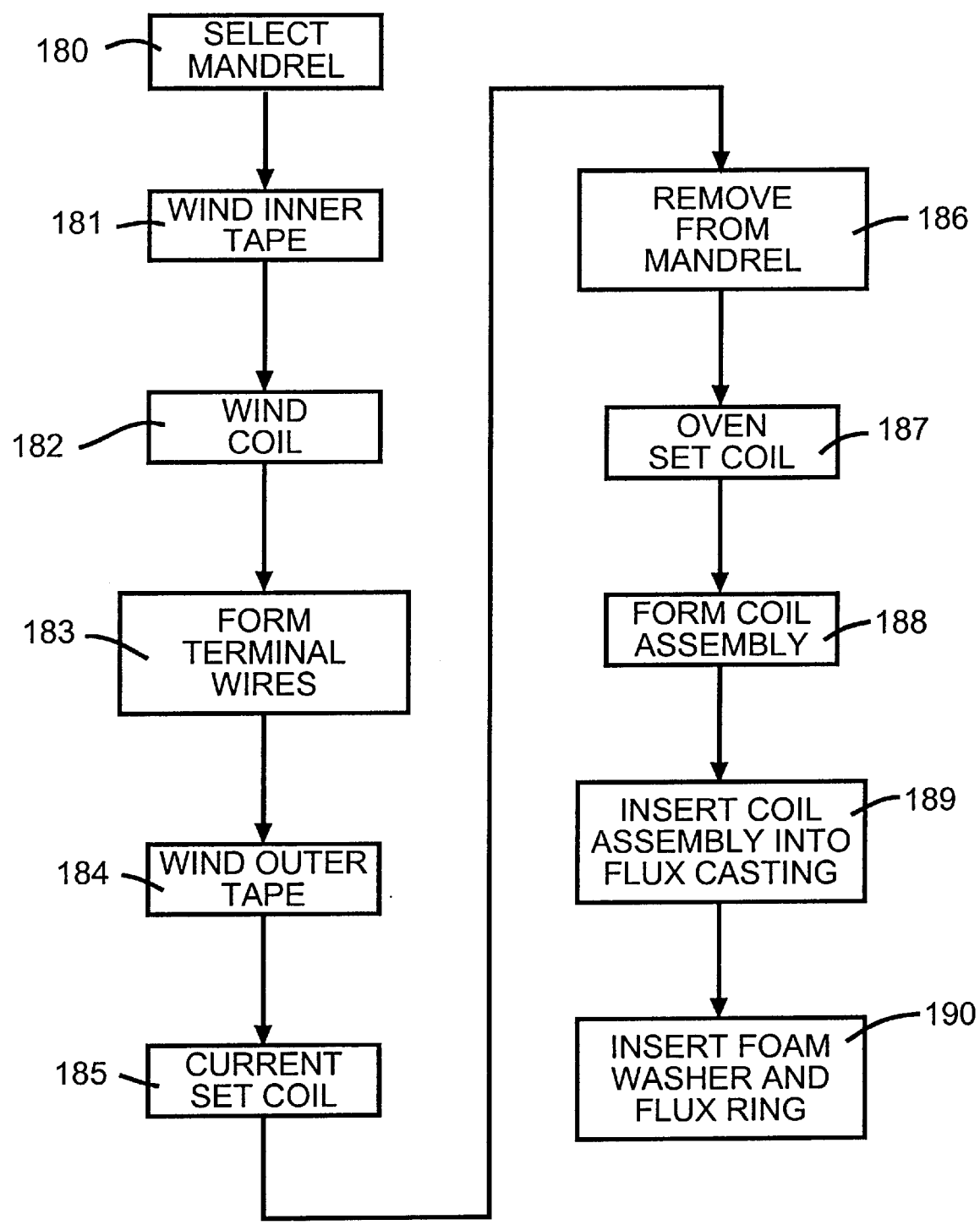
FIG. 14 is a flow chart for a method for manufacturing the bobbinless solenoid coils shown in FIGS. 2 through 4.

The present invention further contemplates a method for manufacturing bobbinless solenoid coils described above. The method is illustrated by the flow chart shown in FIG. 14. In functional block 180, a mandrel having an outside diameter which corresponds to the inside diameter of the coil is selected. The mandrel is mounted upon a high speed coil winding machine.

A layer of electrically insulative tape is wound upon the mandrel in functional block 181. In the preferred embodiment, a commercially available polyimide tape, such as Kapton tape is used; however, other tapes also can be used. If the coil is to include an interior plastic sleeve, the sleeve is positioned on the mandrel.

In functional block 182, the high speed coil winding machine helically winds insulated magnet wire upon the mandrel to form a solenoid coil. The magnet wire can be pre-coated with a thermo-setting epoxy before winding or the epoxy can be included in the wire insulative coating. Alternately, the wire can be passed through an epoxy dispenser as it is fed to the winding machine. The dispenser would apply a coating of the epoxy to the wire.

After the coil is wound, the wire is cut and the terminal wires are formed extending from one end of the coil and parallel to the coil axis, as indicated in functional block 183. In functional block 184, an outer layer of the same electrically insulative tape is wound over the periphery of the coil.

The terminal wires are connected to a power supply in functional block 185 and an electric current is passed through the coil. The heat generated by the current initially sets the epoxy. In functional block 186, the coil is removed from the mandrel.

The coil is placed in a curing oven in functional block 187 and baked to completely set the epoxy and bond the coil windings together to form a rigid coil.

In functional block 188, a coil assembly is formed by positioning an end cap adjacent to the end of the coil having the free standing terminal wires. The terminal wires are inserted through the end cap posts. Additionally, the coil can be encapsulated by dipping the coil assembly in a potting material; however, the encapsulation is optional. As the encapsulate cures, it will protect the winding while bonding the winding to the end cap.

In functional block 189, the coil assembly is inserted into a flux casing with the terminal wires and supporting end cap posts extending through associated flux casing apertures.

An elastic foam washer and steel flux ring are inserted into the open end of the flux casing in functional block 190. The flux ring is retained in the flux casing by a conventional method, such as, an interference fit, spot welding, dimples or swaging.

Figure 15:
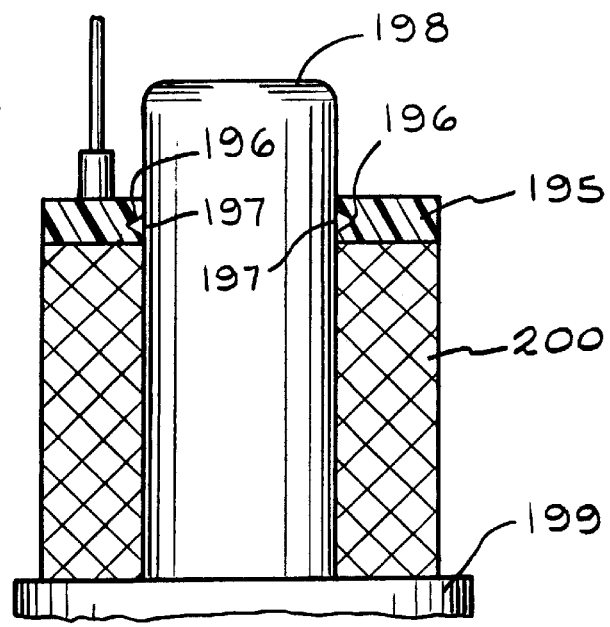
FIG. 15 illustrates a method for winding the bobinless solenoid coils shown in FIGS. 2 through 7.

The present invention also contemplates an improvement in the winding process as shown in FIG. 15. The improvement includes a winding end cap 195 which has a plurality of indentations 196 formed in the surface of its center aperture. The indentations 196 correspond to a plurality of retractable pins 197 carried by a mandrel 198 on a coil winding machine 199. To wind a coil, the pins 197 are retracted into the mandrel 198 and the end cap 195 placed upon the mandrel 198. The pins 197 are extended into the indentations 196 and cooperate therewith to secure the end cap 195 upon the mandrel 198. A length of epoxy coated magnet wire is wound upon the mandrel 198 to form a bobbinless winding 200. Terminal wires (one shown) are formed and inserted into the terminal posts. As described above, an electric current is passed through the winding 200 to fix the epoxy. The epoxy also bonds the end cap 195 to the end of the winding 200. The pins 197 are retracted into the mandrel 198 to allow removal of the winding and end cap assembly from the winding machine 199.

Figure 16:
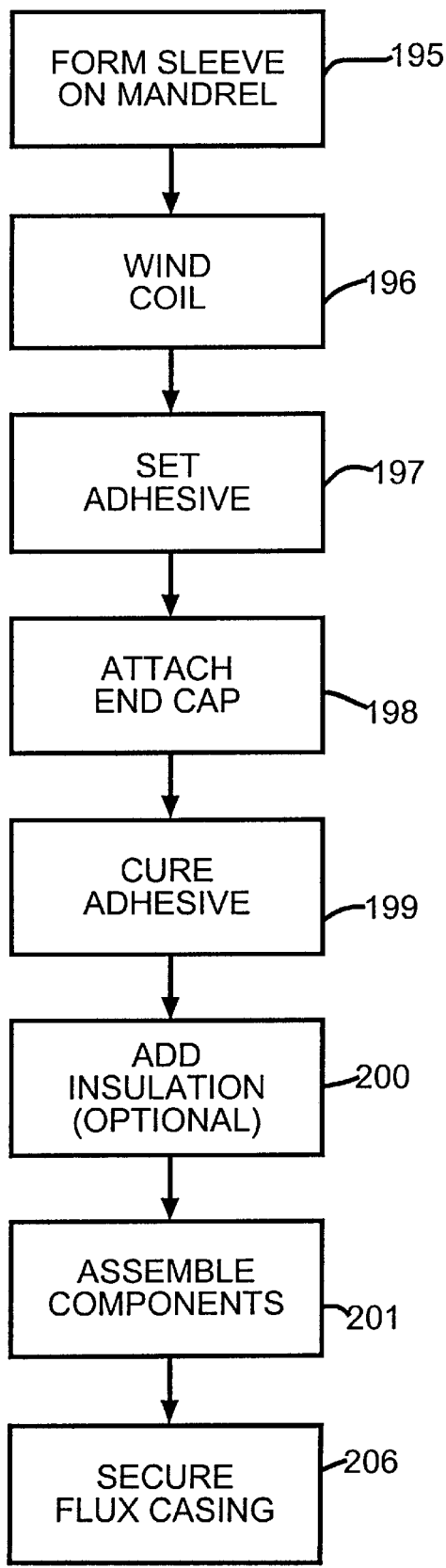
FIG. 16 is a flow chart of a process for fabricating the coil assembly shown in FIG. 8.

The present invention also contemplates an alternate process for fabricating the bobbinless coil assemblies. The process is illustrated in the flow chart shown in FIG. 16 for the coil assembly 130. In functional block 195, a sleeve formed from an electrically insulating material, such as, for example, Kapton, is placed upon a mandrel of a coil winding machine. Alternatively, an insulative tape or sheet of insulative film can be wound onto the mandrel surface. In the preferred embodiment, the insulative layer is approximately one mm thick. Insulated magnet wire that has a thermal setting epoxy coating or other special thermal setting adhesive film disposed thereon is wound upon the insulative layer in functional block 196 to form a coil. While the coil is still on the mandrel, an electric current is passed therethrough in functional block 197 to set the epoxy or adhesive sufficiently to allow handling of the coil. Alternately, a heat gun can be directed at the coil while it is being wound in functional block 196 to set the epoxy or adhesive. A coil end cap with terminal support towers is attached in functional block 198; however, this step may optionally be completed later. When the end cap is attached, the coil lead wires are fed through the terminal support towers.

In functional block 199, the coil is removed from the mandrel and heated in a batch oven to totally cure the adhesive binding together the turns in the coil winding. For additional insulative protection, an electrically insulative tape can be wound over the outside diameter of the coil and an electrically insulative washer applied to the bottom end of the coil, as shown in functional block 200; however, this step is optional. In the preferred embodiment, Kapton is used for this additional electrical insulation.

Figure 17:
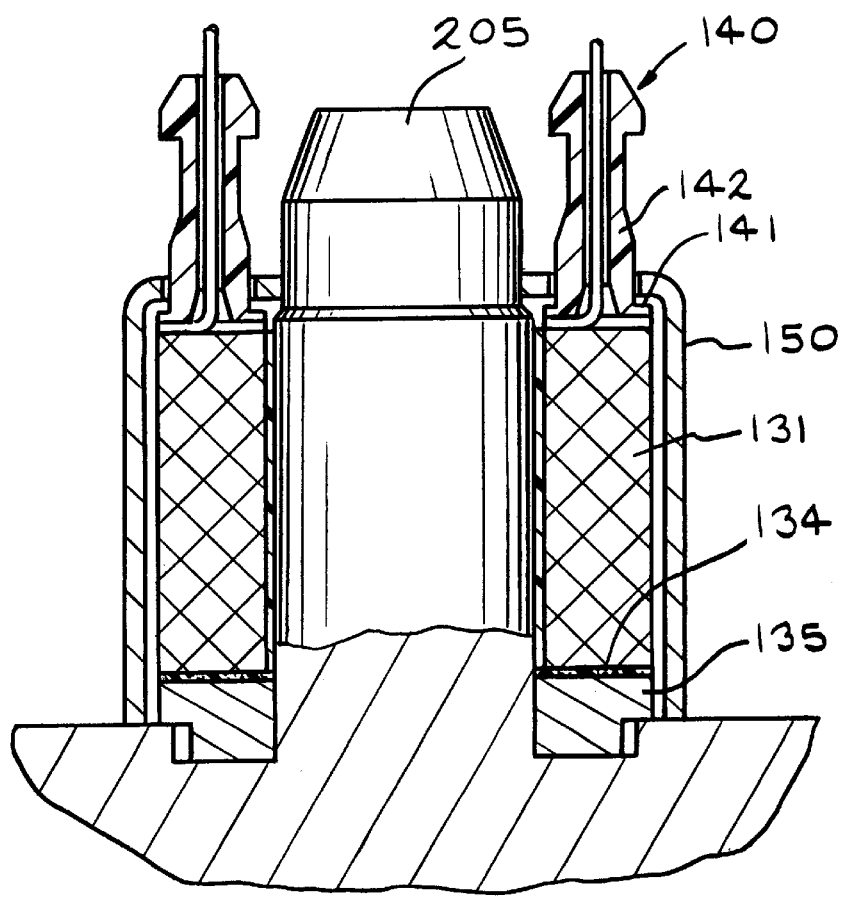
FIG. 17 is a sectional view of an apparatus for fabricating the coil assembly shown in FIG. 8.

In functional block 201, the components of a coil and flux casing subassembly are placed upon a non-stepped cylindrical assembly guide pin 205, as shown in FIG. 17. Components in FIG. 17 which are similar to components shown in FIG. 8 have the same numerical designators. Accordingly, the flux ring 135 is placed upon the guide pin 205 first. Then the coil 131 and end cap 140 are placed over the guide pin 205 and against the flux ring 135. Finally, the flux casing 150 is placed into position. The flux casing 150 is pressed over the flux ring 135 until the casing 150 bottoms against the pin base portion adjacent to the step in the flux ring 135. The guide pin 205 maintains alignment of all of the components during assembly. The lower end of the flux casing 150 is secured to the flux ring 135 in functional block 206 by a conventional process, such as press fitting, adhesively securing, magneforming, spot welding or crimping.

Figure 18:
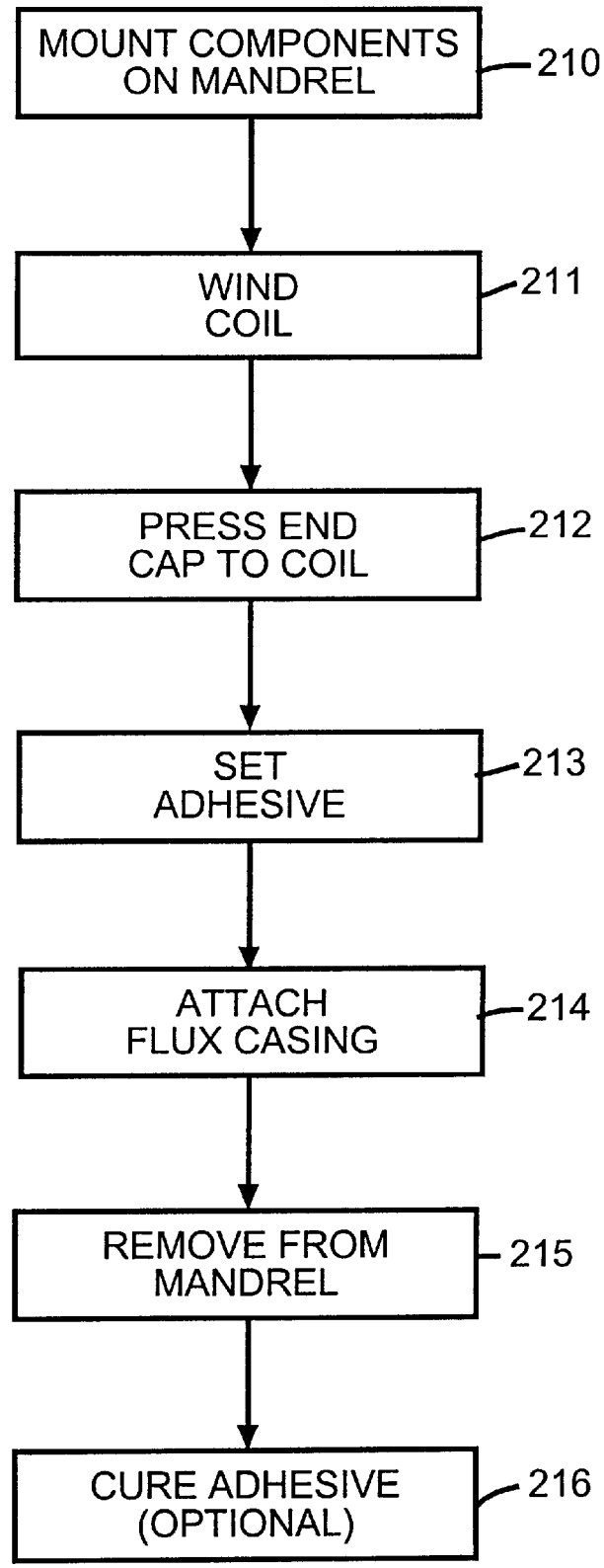
FIG. 18 is a flow chart of a process for fabricating the coil assembly shown in FIG. 11.

An alternate embodiment of the process for the coil assembly 160 is shown in FIG. 18 and allows a simplification of the fabrication process described above. It is contemplated that both the end cap 165 and the flux ring 135 are placed upon the winding mandrel in functional block 210. Depending upon the properties of the wire insulation, an optional Kapton washer 134, which may be placed upon the winding mandrel adjacent to the flux ring 135. The end cap 165 is spaced apart from the flux ring 135 upon the mandrel to allow for the winding of the coil. The spacing upon the mandrel is slightly greater than the length of the finished coil to allow for winding the coil. In the preferred embodiment, the additional spacing is approximately one mm.

In functional block 211, a start-lead is pulled laterally into one of the end cap chimneys via the snap-in side grooves and then into the lead-in channel. The coil is then precision, level wound and an exit lead is laterally snapped into the other end cap chimney. The end cap is pressed against the end of the coil in functional block 212.

In functional block 213, the adhesive is set. It is intended that the wire epoxy coating or adhesive film not only bonds the coil winding turns together, but also bonds the end cap, Kapton washer and flux ring with the coil winding as an integral coil subassembly. This eliminates handling of these components. As described above, it is contemplated that the adhesive can be set by passing an electric current though the coil after winding, but while the coil is still on the mandrel, or by heating the wire as the coil is wound. Alternately, the wire can be feed through a solvent while wound upon the mandrel. The solvent would soften the adhesive coating upon the wire. Following winding, the solvent would evaporate while the adhesive binds together the components of the coil assembly.

The flux casing is pressed over the coil subassembly upon the mandrel in functional block 214. Accordingly, the flux casing becomes a handling container while the handling of coil itself is minimized, thus reducing the fabrication cost of the coil assembly. The flux casing is secured to the coil by a conventional process, such as press fitting, adhesively securing, magneforming, spot welding or crimping. It will be appreciated that some of these processes may be applied after the coil assembly The coil assembly is removed from the mandrel in functional block 215. The flux casing and coil assembly are then heated in a batch oven in functional block 216 to cure the adhesive; however, depending upon the adhesive used, this step can be optional.

In the preferred embodiment, a low-temperature setting adhesive is used for which the setting of the adhesive while the coil is on the winding mandrel in functional block 212 is sufficient to bond the components of coil assembly together. Alternately, a high-temperature setting adhesive can be used to provide maximum strength bonding of the components. Accordingly, functional block 216 would then be included to completely cure the high-temperature setting adhesive.

The above described bobinless coil assemblies include wiring guides in the coil end cap while eliminating separate terminal pins. Accordingly the prior art assembly step of soldering coil lead wires to terminal pins is eliminated. For the coil 160, the inside and outside taping of the coil with an electrically insulative material is eliminated. Additionally, bonding and the use of the thin Kapton washer 134 provide an improved heat transfer path through flux ring to control valve which is superior to coils wound upon convention plastic bobbins. The heat path is further improved by axial loading provided by the resilient fingers formed upon end cap. As a result, heat build up within the electronic control module during ABS operation is reduced. Furthermore, the reduced number of components included in the coil assembly minimizes parts handling and transfers while reducing fabrication time and costs. It also is expected that the bobbinless coils will allow a reduction in the size of the ABS electronic control module while generating a higher Magnetomotive Force during use.

In accordance with the provisions of the patent statutes, the principle and mode of operation of this invention have been explained and illustrated in its preferred embodiment.

However, it must be understood that this invention may be practiced otherwise than as specifically explained and illustrated without departing from its spirit or scope. For example, while the invention has been described as being included in an anti-lock brake system, it will be appreciated that the invention can also be applied to solenoid valves in other systems, such as, for example, traction control systems and vehicle stability systems. Additionally, it also will be appreciated that the structural details shown in one embodiment can be applied to the alternate embodiments. Thus, for example, the invention can be practiced with the foam washer 55 shown in FIG. 3 substituted for the beads of adhesive 90 and 91 shown in FIG. 4.

What is claimed is:

1. A coil for a solenoid valve comprising:

a winding having a plurality of turns of helically wound magnet wire which defines an axial bore, said bore adapted to slidingly receive a hollow valve sleeve of a solenoid valve, said magnet wire having at least one end forming a terminal wire;

an adhesive coating disposed upon said magnet wire which extends over the length of the magnet wire and binds said winding turns into a rigid structure;

a cup-shaped flux casing formed from a ferro-magnetic material, said flux casing having a closed end, said closed end having at least one aperture formed therethrough, said flux casing receiving said coil; and an end cap disposed between an end of said winding and said flux casing, said end cap including an annular base portion and a terminal wire support post formed upon said base portion, said terminal wire support post being generally perpendicular to said base portion and extending through said flux casing aperture, said terminal wire support post having an axial opening formed therein which receives a portion of said terminal wire, said terminal wire extending beyond said terminal wire support post.

2. A coil according to claim 1 wherein said terminal post axial opening is a slot which extends radially to an edge of said end cap base portion, said slot receiving said terminal wire.

3. A coil according to claim Therein said terminal post axial opening is an axial bore formed through said terminal post, said bore receiving said terminal wire.

4. A coil according to claim 1 further including an annular flux ring disposed in said open end of flux casing adjacent to said winding, said flux ring secured to said flux casing to retain said winding within said flux casing.

5. A coil according to claim 4 also including a ring formed from a resilient material disposed between said flux ring said winding end.

6. A coil according to claim 4 wherein said adhesive coating is an epoxy.

7. A coil according to claim 4 wherein a first layer of an electrically insulative material is disposed upon the radially inner surface of said winding axial bore and a second layer of electrically insulative material is disposed upon the radially outer surface of said winding.

8. A coil according to claim 4 further including an adhesive backed tape wound about the outer surface of said winding, said tape extending onto the surface of said end cap base portion to retain said end cap upon an end of said winding.

9. A coil assembly according to claim 1 wherein said adhesive coating also binds said end cap to said end of said coil.

10. A coil assembly according to claim 9 wherein the coil assembly includes a washer formed from an electrically insulative material, said washer adhesively attached to an end of said winding which is opposite from said end cap, and further wherein an annular flux ring is adhesively attached to said insulative washer.

11. A coil assembly according to claim 9 wherein said flux casing has an open end opposite from said closed end, said open end of said flux casing receiving and being secured to a flux ring, and further wherein said end cap includes a plurality of resilient fingers formed thereon which extend away from a plane defined by said end cap base portion, said end cap fingers cooperating with said flux casing to urge said winding and end cap in an axial direction toward said flux ring.

12. A coil assembly according to claim 11 wherein said terminal wire support post has a barb formed upon an end thereof, said barb adapted to be inserted through an aperture formed in a printed circuit substrate to secure the coil assembly thereto.

13. A coil assembly according to claim 12 wherein said terminal wire support post barb includes at least one axial slot formed therein, said slot also extending into said terminal wire support post to form two portions of said terminal wire support post said slot allowing compression of said barb and terminal wire support post for insertion of said barb through said circuit substrate aperture.

14. A coil assembly according to claim 11 wherein said winding has an inside diameter and said flux casing includes an arpeture formed through said closed end, said flux casing arpeture having an inside diameter which is less than said winding inside diameter and further wherein said flux ring and flux casing are adapted to receive a stepped solenoid valve sleeve, said flux ring and flux casing cooperating with said stepped sleeve to maintain a spacing between said winding and said valve sleeve.

15. A coil assembly according to claim 11 wherein said winding has an inside diameter and said end cap casing includes an arpeture formed therein, said end cap ring arpeture having an inside diameter which is less than said winding inside diameter and further wherein said flux ring and end cap are adapted to receive a stepped solenoid valve sleeve, said flux ring and flux casing cooperating with said stepped sleeve to maintain a spacing between said winding and said valve sleeve.

16. A coil assembly according to claim 11 wherein said winding has an inside diameter and said end cap includes an arpeture formed therein, said end cap arpeture and said flux ring having inside diameters which are less than said winding inside diameter and further wherein said end cap and flux ring are adapted to receive a solenoid valve sleeve, said end cap and flux ring cooperating with said solenoid valve sleeve to maintain a spacing between said winding and said valve sleeve.

17. A coil assembly according to claim 11 wherein said winding has an outside diameter and further wherein said flux ring and said end cap have outside diameters which are greater than said winding outside diameter, said flux ring and said end cap cooperating with said winding to maintain a spacing between said winding and said flux casing.

* * * * *

UNITED STATES PATENT AND TRADEMARK OFFICE
CERTIFICATE OF CORRECTION

PATENT NO. : 6,124,775
DATED : September 26, 2000
INVENTOR(S) : Herbert L. Linkner, Jr.

It is certified that error appears in the above-identified patent and that said Letters Patent are hereby corrected as shown below:

In Column 14, Claim 3, line 1, delete "Therein" and insert --1 wherein--.
In Column 14, Claim 4, line 2, after "of" insert --said--.
In Column 14, Claim 5, line 2, after "said flux ring" insert --and--.

Signed and Sealed this

First Day of May, 2001

*Attest:*

NICHOLAS P. GODICI

*Attesting Officer*  *Acting Director of the United States Patent and Trademark Office*